(12) United States Patent
Land

(10) Patent No.: US 6,290,819 B1
(45) Date of Patent: Sep. 18, 2001

(54) DISTILLATION APPARATUS

(75) Inventor: Glenn E. Land, Independence, VA (US)

(73) Assignee: Environmental Technology Enterprises, LLC, Independence, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/272,366

(22) Filed: Mar. 19, 1999

Related U.S. Application Data

(63) Continuation-in-part of application No. 08/649,013, filed on May 16, 1996, now Pat. No. 5,932,073.

(51) Int. Cl.[7] .................. B01D 3/42; C02F 1/04
(52) U.S. Cl. .................. 202/83; 202/181; 202/188; 202/185.3; 202/206; 202/237; 202/242; 203/1; 203/10; 392/448
(58) Field of Search .................. 202/185.3, 83, 202/181, 269, 188, 189, 206, 237, 242, 245, 251, 185.5, 185.6; 203/1, 10; 219/201; 159/DIG. 41; 392/448, 326, 374, 398, 401, 402, 406

(56) References Cited

U.S. PATENT DOCUMENTS

| | | |
|---|---|---|
| 364,199 | 5/1887 | Coyle . |
| 473,164 | 4/1892 | Rochlitz . |
| 818,831 | 4/1906 | Kleitz . |
| 861,485 | 7/1907 | Stokes . |
| 999,793 | 8/1911 | Jewell . |
| 2,614,816 | 10/1952 | Hull . |
| 3,340,157 | 9/1967 | Weiss . |
| 3,350,279 | 10/1967 | Tolchin .................. 202/83 |
| 3,351,536 | 11/1967 | Fox .................. 202/83 |
| 3,507,753 | 4/1970 | Jacuzzi . |
| 3,870,605 | 3/1975 | Sakamoto .................. 202/83 |
| 3,935,077 | 1/1976 | Dennison . |
| 3,980,526 | 9/1976 | Kirschmann . |
| 4,052,267 | 10/1977 | McFee . |
| 4,081,750 | 3/1978 | Weiss . |
| 4,089,750 | 5/1978 | Kirschmann et al. . |
| 4,187,150 | 2/1980 | Rich . |
| 4,247,369 * | 1/1981 | Bean .................. 203/10 |
| 4,339,307 | 7/1982 | Ellis, Jr. . |
| 4,342,623 | 8/1982 | Loeffler .................. 202/83 |
| 4,607,501 | 8/1986 | Vanher .................. 202/234 |
| 4,715,433 | 12/1987 | Schwarz et al. .................. 165/110 |
| 4,861,435 | 8/1989 | Sweet, Jr. . |
| 4,882,012 | 11/1989 | Wasserman . |
| 4,894,123 | 1/1990 | Helmich . |
| 4,917,770 | 4/1990 | Asbury et al. . |
| 4,943,353 | 7/1990 | Shannon . |
| 5,053,111 | 10/1991 | Ellerbe, Jr. . |
| 5,178,734 | 1/1993 | Palmer . |
| 5,203,970 | 4/1993 | Ellis, Jr. . |
| 5,266,170 | 11/1993 | Weber et al. . |
| 5,286,350 | 2/1994 | Huang . |
| 5,368,698 | 11/1994 | Field et al. . |
| 5,409,126 | 4/1995 | De Mars .................. 220/4.27 |
| 5,492,602 | 2/1996 | Vogelman et al. . |
| 5,565,065 | 10/1996 | Wang .................. 203/10 |

FOREIGN PATENT DOCUMENTS

| | | |
|---|---|---|
| 1169908 | 9/1958 | (FR) . |
| 2502969 | 10/1982 | (FR) . |

* cited by examiner

Primary Examiner—Virginia Manoharan
(74) Attorney, Agent, or Firm—Jones, Tullar & Cooper

(57) ABSTRACT

A continuous-flow water distiller includes a housing having a removable heating vessel which receives water to be distilled A heater is immersed within the water in the vessel for producing steam. The housing includes an openable lid which, when closed, seals the heating vessel so that steam can be directed through an outlet into a condenser located in the housing. Raw water is supplied to the heating vessel through a heat exchanger to preheat the raw water by effectively utilizing thermal energy recovery to initiate cooling of the steam, and distillate is supplied through the condenser to enhance heat exchange.

13 Claims, 4 Drawing Sheets

DISTILLATION APPARATUS

This application is a continuation-in-part of U.S. application Ser. No. 08/649,013, filed May 16, 1996, now U.S. Pat. No. 5,932,073, which issued on Aug. 3, 1999.

BACKGROUND OF THE INVENTION

The present invention relates, in general, to a distillation device for purification of water, and more particularly to a compact, continuous flow distiller for supplying pure drinking water.

The global need for safe drinking water is commonly recognized. Increasing awareness of health problems resulting from chemicals, bacteria and viruses in drinking water is well documented. Point of use water purification by distillation is the best and only solution that addresses all water contamination problems.

Many water distillers have been developed to provide pure drinking water, however certain problems still exist in the art. Examples of some of these problems are: (1) some distillers are not economical since they have unnecessary maintenance cost and a low energy efficiency; (2) some produce too much heat radiating into the air, particularly in small offices and enclosed work area; (3) most water distillers are noisy because they have electric cooling fans that run at inconvenient times; (4) some water distillers have attempted to overcome the noise problem by using water cooled condensers; however, in the prior art this has created wastewater and required additional plumbing; and (5) some water distillers are difficult to maintain in good operating condition because of the difficulties encountered in cleaning sediment and scale from the interior of the distiller. In fact most water distillers require a substantial amount of disassembly involving multiple parts in order to fully clean the boiler. In many cases, the user will not realize the difficulty of this job until the water distiller fails to produce water up to its rated capacity.

Numerous attempts have been made to facilitate the de-scaling and cleaning of distillers, but such attempts have not completely solved the problems in the prior art. In most cases, such attempts have resulted only in additional plumbing and additional components, requiring additional maintenance and increasing the cost of the unit. Thus, the cost and maintenance of these prior art devices is an acknowledged disadvantage.

To avoid the need to disassemble a distiller, many attempts have been made to address the cleaning problem by the use of after market chemicals for removing scale in the boiler. However, this has not eliminated the difficult periodic required manual cleaning for proper maintenance of distiller components. Further, the use of chemicals for this purpose is expensive, a waste of natural resources and ultimately adds to the already-serious pollution problems.

SUMMARY OF THE INVENTION

It is a primary object of the present invention to address environmental and public health concerns regarding the provision of safe drinking water in an effective manner.

It is a further object of the invention to provide a water distiller that is more economical and energy efficient; for example; by effectively utilizing thermal energy recovery to preheat water to be treated; by operating during lower electrical rate periods; and by eliminating wastewater.

It is another object of the invention to reduce heat radiation into the surrounding air space, particularly during normal office and working hours by operating primarily during off work hours and/or by evacuating heat to a remote location.

It is another object of the invention to provide a water distiller which is so constructed as to protect the condenser from being negatively affected by radiant heat from the boiler or from the boiler heat source by positioning the condenser below the boiler and heat source.

It is another object of the invention to provide a water distiller that reduces noise, particularly during normal office and working hours, by eliminating a condenser fan and/or by operating during off work hours.

Yet another object of the invention is to provide a water distiller that may use cooling water to enhance heat exchange without creating wastewater, without requiring plumbing and connections to a house or building drain system, and without fouling cooling water tubing by utilizing distilled water from the reservoir for this purpose.

A still further object of the invention is to eliminate the difficulties and the cost encountered in cleaning sediment and scale from the interior of a boiler in a distiller by providing a removable boiler [in a distiller], which is seated within the housing in such a way that it can be easily removed for cleaning or replacement.

Another object of the invention is to provide a water distiller with a protective control to prevent the boiler from running dry, thus preventing scale.

Briefly, the present invention is directed, in its preferred embodiments, to a water distillation system which effectively addresses known problems in the art. The embodiments are directed to a continuous-flow distiller for permanent placement as a freestanding unit in any desired location. Such a device provides a continuous supply of pure water and may, for example, serve as a drinking fountain. The distiller includes a removable heating vessel, or boiler, which receives water that is to be treated, and a heater. The water in the boiler is boiled by the heater and the resulting steam or vapor is directed into, and through, a condenser which provides heat exchange surfaces to allow the steam to give off its heat through the condenser walls, thereby causing the steam to return to its water form. The lowermost end of the condenser includes a drain opening which directs the distilled water into a reservoir, or storage container. The storage container may be a stationary container for use, for example, in a water fountain and a pump may be provided to deliver water from this container.

In a preferred embodiment, the components are located within a housing having a hinged access lid at the top. The boiler is supported in the housing, as by suitable angle brackets or other supports, and may be in the form of an insulated double wall pot of stainless steel. The boiler may have a recessed area in its bottom with a drain tube and a drain spigot connected to a drain hole therein, extending downwardly and outwardly through a side hole in the housing. The open top of this boiler is closed and sealed by the housing lid, with an outlet steam port in the lid being connected to the inlet of a condenser. Preferably, the steam port is connected by way of a suitable pipeline, which passes through a raw water pre-heating chamber on its way to the inlet of the condenser. The raw water pre-heating chamber has an inlet and an outlet. Water to be distilled is supplied by way of a raw water inlet pipe to the pre-heating chamber inlet and preheated raw water is supplied from the chamber outlet to the boiler by way of a supply pipe passing through the hinged lid.

The outlet steam port and pipeline leads steam from the boiler to the inlet of the condenser, which in accordance with the present invention is located below the boiler and below the boiler heat source. The condenser, in a preferred embodiment, is water and air-cooled and includes a downwardly coiled, double-wall tubing or a smaller tube within a larger tube. Cooling water flows through the inner tube, while steam enters the larger outer tube at a steam inlet and flows downwardly as it condenses. The resulting distillate flows downwardly by gravity to a distillate outlet drain.

An enclosed container or storage vessel is located below the condenser and receives water from the distillate drain for storage and subsequent distribution through a suitable outlet such as a distillate spigot which may be located at any desired position on the housing. If the spigot is located above the storage container, a pump may be provided to deliver water to it.

The smaller, cooling-water, inner tubing of the condenser extends downwardly, through the distillate drain at the lower end of the condenser, and is connected to an outlet of a cooling-water pump located, if so desired, at the bottom of the storage container. At the upper end of the condenser the cooling-water tubing exits the condenser through a hole in the outer steam tubing and extends downwardly through a hole in the top of the storage container and terminates at a cooling-water exit within the storage container.

The heating unit for the boiler preferably is a horizontal heating element connected to the lower end of a vertical heating unit stem, or support, that is connected to, and extends downwardly from, the lid.

A second embodiment of the invention is essentially the same as the first embodiment; however, in this case the condenser is of the heat exchange chamber or plate(s) type having cooling water circulated within and through the chamber or plate configuration, as is known in the industry. In any event, a cooling fan may be used, if desired, to enhance the flow of ambient air on the outside surfaces of the condenser.

A third embodiment is similar to the first and second embodiments, the difference being that the condenser is a typical coiled finned tubing type with a cooling fan and a shroud. Also the cooling-water pump and associated tubing have been eliminated.

A fourth embodiment is similar to the third embodiment, the difference being the addition of an exhaust pipe and hose to exhaust radiant heat from the condenser to a remote location such as outside a house or building.

Although four embodiments are illustrated, it will be understood that the specific shape and dimensions of the distiller can be varied to adapt it to a wide range of applications in various industries and at any desired location. It will become clear in the following description that the device provides a continuous flow water distiller with unique improvements and advantages over prior art including: (a) a significant increase in energy efficiency; (b) a significant reduction of heat in the surrounding air space; (c) significant reduction of noise; (d) the elimination of wastewater; and (e) the device is also unique in that it can be easily cleaned by simply lifting the lid of the housing and lifting the boiler out for cleaning purposes. This also facilitates replacement of the boiler if necessary, and provides ready access to the heater unit for adjustment or repair.

BRIEF DESCRIPTION OF THE DRAWINGS

The foregoing, and additional objects, features and advantages of the present invention will be more fully understood by reference to the following detailed description of preferred embodiments thereof, taken in conjunction with the accompanying drawings, in which.

DESCRIPTION OF PREFERRED EMBODIMENTS

Figure 1:
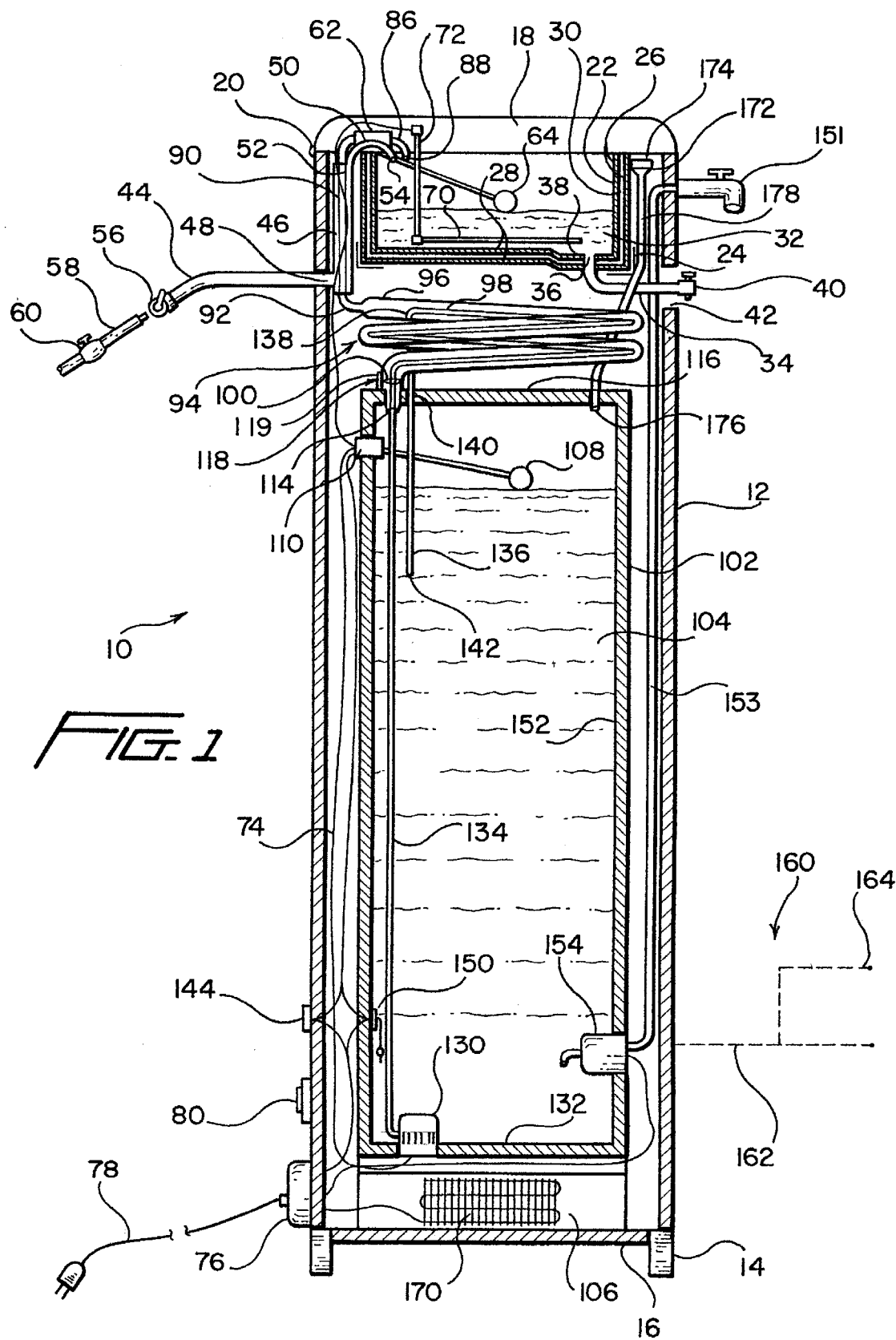
FIG. 1 is a cross sectional view of a preferred embodiment of the present invention, illustrating the components of a continuous mode distiller including a water and air-cooled, double tubing condenser.

Turning now to a more detailed consideration of the present invention, there is illustrated in FIG. 1 a continuous mode water distiller generally indicated at 10. The distiller includes a housing 12 which may be generally cylindrical, if desired, and which is preferably constructed of metal or a durable plastic material. The housing 12 is supported by a stand 14 and is closed at its bottom by a bottom wall 16 and at its top by a hinged lid 18. The lid 18 preferably is secured to the top edge of housing 12 by one or more hinges 20 and may be opened by pivoting it upwardly and to the left, as viewed in FIG. 1, to provide access to the interior components of the distiller 10.

The distiller 10 incorporates a removable double-wall boiler pot or vessel 22 that is supported within the housing 12 by suitable brackets 24, for example. These brackets 24 are secured to the interior of the housing 12 and provide a seat for receiving boiler 22 and holding it securely in place within the housing. The boiler 22 incorporates, for example, cylindrical, dual, spaced side walls 26 and flat, circular, dual, spaced bottom walls 28 providing a thermally insulative air space 30 between the dual walls and dual bottom. The boiler 22 is for receiving water 32 which is to be distilled. If desired, the boiler 22 may further incorporate a drain line 34 connected to a drain outlet 36 in a recessed area 38 in its bottom wall 28. A drain spigot 40 at the end of the drain line 34 may protrude through a drain opening 42 in the housing 12 for draining the water 32 from the boiler 22. The brackets 24 are so located as to position the boiler 22 with its open top edge engageable by a seal on the interior of lid 18 so that when the lid is closed, the boiler 22 is closed and sealed to prevent the escape of steam during the distillation process.

Raw water to be boiled is supplied to the boiler 22 by way of a feed line 44 which is connected to a pre-heating chamber 46 at a pre-heating inlet 48. The raw water passes through a heat exchange passageway in the pre-heating chamber 46, then through a connector line 50 connected to a pre-heating chamber outlet 52. Connector line 50 extends through lid 18 and terminates above the interior of the boiler 22 at a nozzle 54. Feed line 44 is connected by way of a quick connect junction 56 to a water supply line 58 with the water flow being regulated by a valve 60. The level of water in boiler 22 is regulated by a controller 62 operated by a float 64, the float serving to sense the water level, and the controller 62 serving to regulate the flow of water into the boiler 22 by way of a conventional valve at nozzle 54.

A heat source 70 is disposed within the boiler 22 and is connected to the bottom of a support such as a vertical stem 72, which in turn is mounted on and extends downwardly from the inside of the lid 18. The stem 72 and the heater 70 move with the lid, and the heater is submerged in water 32 when the lid 18 is closed. The heater 70 is connected by way of an electrical cord 74 through control box 76 and cord 78 to a suitable source of power (not shown). The control box 76 may be connected to an on-off control switch 80, and may include a thermostat, circuit breakers, and related controls for the heater.

Included in lid 18 is an outlet steam port 86 which has an inlet end 88 which is positioned above the boiler 22 when the lid 18 is closed for conveying steam from the boiler 22 through a steam tube 90 which passes through the preheating chamber 46 in route to the inlet end 92 of a condenser 94. The heat from the steam in tube 90 preheats the raw water being supplied to the boiler from chamber 46 through connector line 50.

The condenser 94, in the illustrated preferred embodiment of FIG. 1, includes a downwardly coiled double tubing comprising an outer tube 96 to provide a passageway for steam to condense into distillate and an inner tube 98 to provide a passageway for cooling water to travel in the opposite direction of the steam. A distillate drain terminal 100 at the lower end of the outer tubing 96 directs distilled water into a storage container 102 supported within the housing 12. The container 102 receives and stores distilled water 104 from condenser 94 and is supported within housing 12 by a suitable base 106 The water storage container 102 may be of a suitable plastic material and incorporates a level control float 108 connected to a heater control switch 110 for switching the heater 70 on and off in response to the water level in the container 102. Switch 110 is connected in series in power line 74 for this purpose, and enables the heater 70 to automatically switch on when the water level in the storage container 102 falls below a set level.

The distillate drain terminal 100 is spaced slightly above an inlet 114 in the top wall 116 of storage container 102, the spacing between drain 100 and inlet 114 serving as a gas vent 118 for the system to provide equalization of pressure in the condenser 94 and in the storage container 102. If desired, an air filter 119 may be provided around the vent 118 to prevent entry of contaminates into the container 102.

A cooling water pump 130 located, for example, in a suitable housing mounted on the bottom wall 132 of the storage container 102 is provided to deliver cooling water from the storage container upwardly through a cooling water delivery line 134. The pump 130 supplies water to the lower end of the inner tubing 98 of the condenser 94 wherein it is conveyed through the condenser in the opposite direction of the flow of steam, thus providing excellent heat exchange within condenser 94. A cooling water return line 136 connected to an inner tube exit port 138, located near the inlet end 92 of the outer tubing 96, extends downwardly through a return port 140 in the top wall 116 of container 102 to a cooling-water terminal 142 within container 102 to provide a return passageway for the cooling water. If desired, an external water source may be used for cooling, but the use of distilled water from container 102 is preferred, since this water is clean and will not foul the cooling tube.

A timer control 144 may, if desired, be in line with cord 74 to provide power to the heat source 70 (and cooling water pump 130 of FIGS. 1 & 3) only during predetermined time periods; for example, between six PM and six AM, to provide a distiller that eliminates noise and radiant heat from the distiller in an office or work place during normal working hours. This also provides a distiller that operates in off peak power demand periods, thus taking advantage of cheaper electric rates and may negate a need for an upgrade in wiring or power source capacity. This also provides a distiller that assures substantial replacement of water in its storage container 102 thus preventing the stored water from becoming stale or stagnant.

If desired, a low water sensor 150 may be located, for example, on a side wall 152 of the storage container 102 to sense an extreme low water level in container 102, and may be connected to the controller 76 to provide power to the heater 70 (and pump 130 of FIGS. 1 & 3) to bypass the timer control 144 to provide distiller operation during times when extra production is required.

Water in the storage container 102 is delivered to a suitable outlet spigot 151 which may be connected by way of water line 153 to a pump 154 located, for example, in a suitable housing mounted on the side wall 152 of the container 102. It will be understood that in the alternative, the pump 154 can be mounted on the top wall 116 of the container 102 or, if desired, the spigot 151 can be mounted directly into the side wall 152 of the container 102 near the bottom thereof In the event an air cooled condenser is used, as will be described with respect to FIGS. 4 and 5, pump 154 may, if desired, be mounted on the bottom wall 130 of container 102.

In yet another alternative, the distiller 10 may provide water to a remote delivery system, indicated in phantom at 160 (FIG. 1), wherein pump 154 may be connected by suitable pipeline(s), indicated by dotted line(s) 162, to one or more remote spigots 164, which may be located at remote location(s) such as on counter top(s), in office(s), and/or in hallway(s).

If desired, a water cooling system 170 may be disposed within the base 106 below the storage container 102 for cooling the water 104 in the storage container 102, in known manner.

Also, if desired, a filler 172 with a filler cap 174 may be located just below lid 18 between the boiler 22 and the housing 12. The filler may be connected to a nipple 176, which may be screwed through a hole in the top wall 116 of storage container 102, by way of a filler line 178 to provide a passageway for initially introducing a small amount of distilled water into storage container 102 for providing start up water for the cooling water pump 130 (FIGS. 1 & 3).

Figure 2:
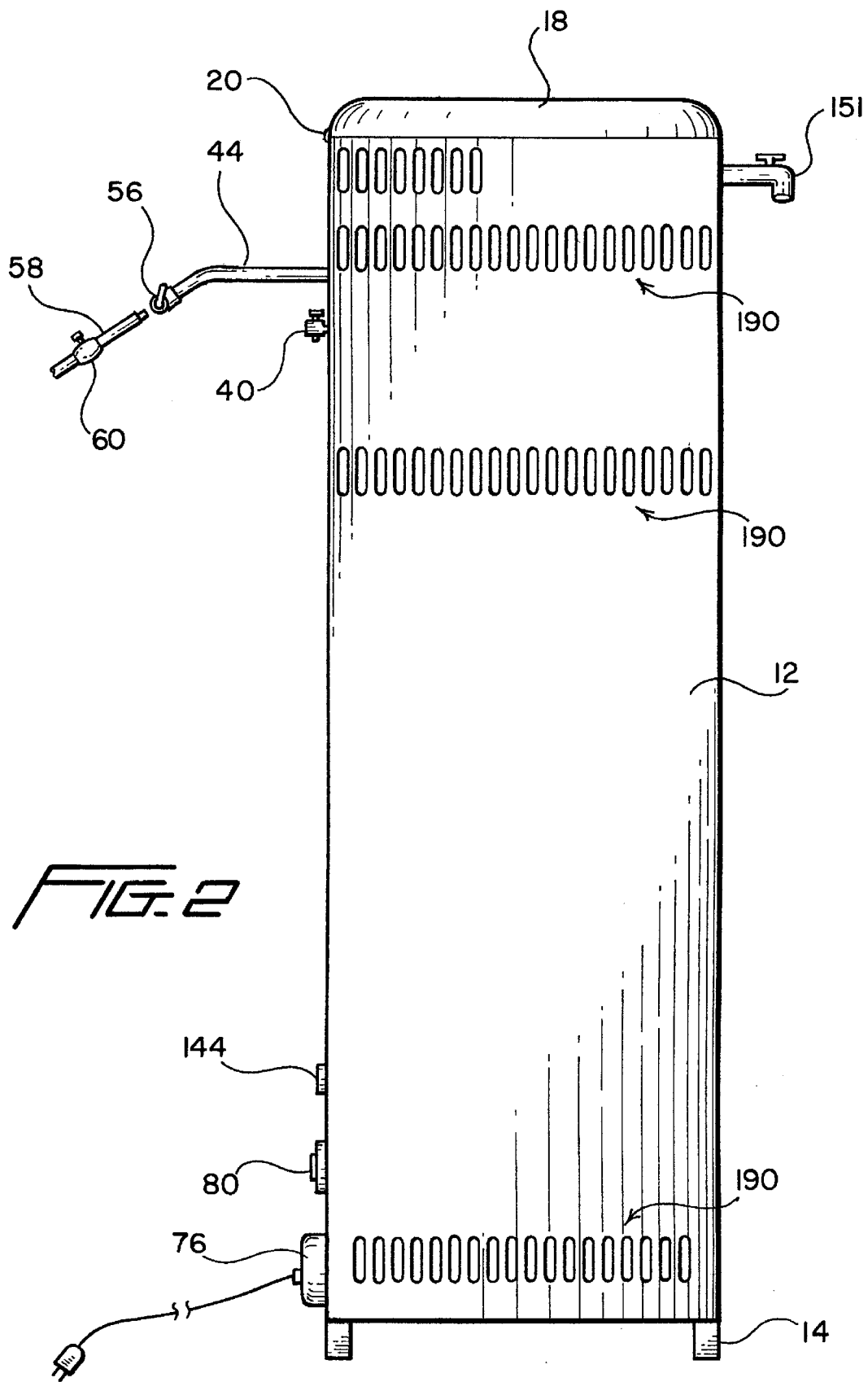
FIG. 2 is a side elevation view of the distiller of FIG. 1 illustrating a plurality of air vents.

As best illustrated in FIG. 2, a number of air inlet and outlet vents 190 are provided in the housing 12 to permit a free flow of air through the water cooling system 170 and through the condenser 94, with air entering the vents below the condenser 94 and passing upwardly through the condenser before exhausting through exit vents located above the condenser.

Figure 3:
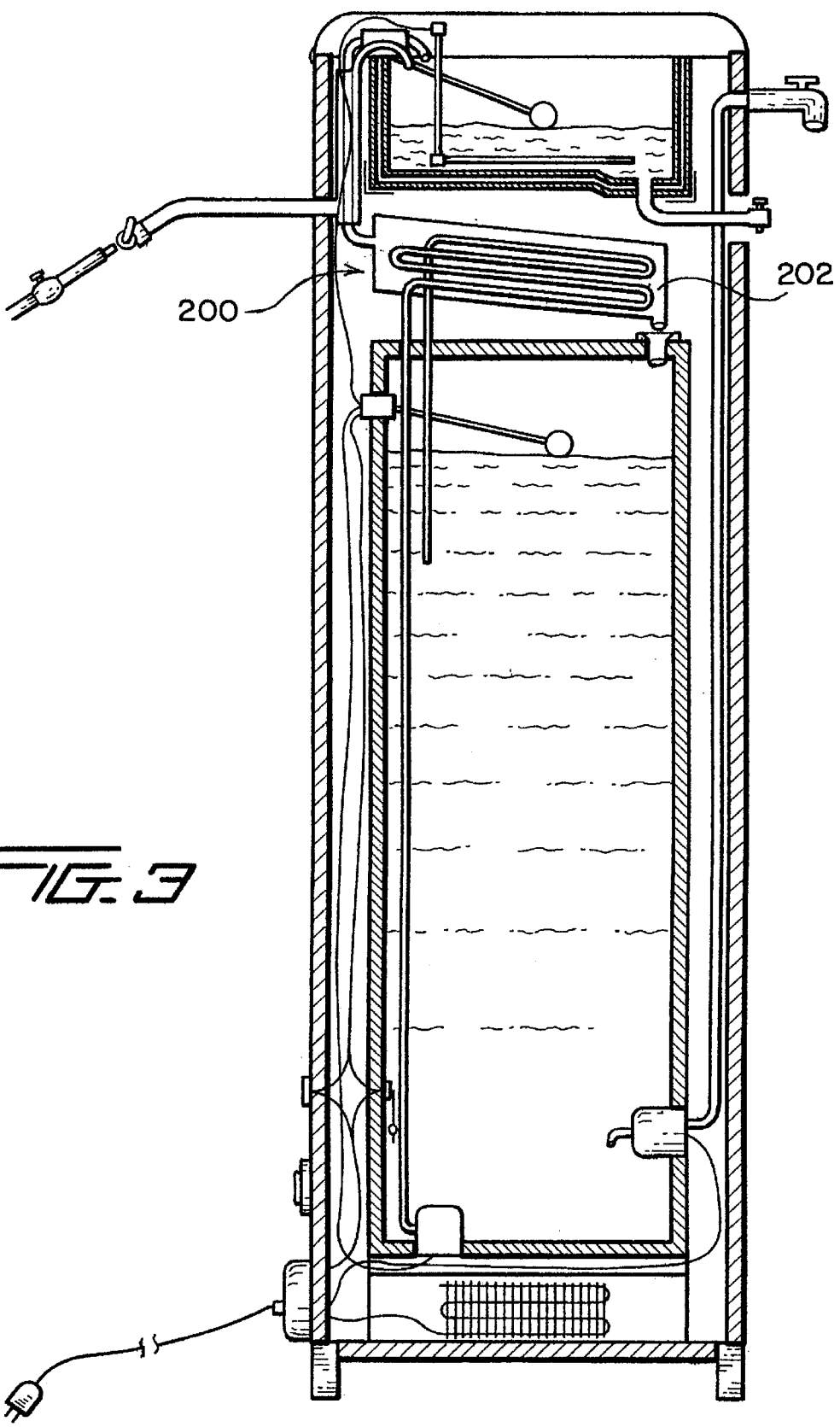
FIG. 3 is a cross sectional view of a second embodiment of the present invention, illustrating a continuous mode distiller including a water and air-cooled chamber or plate type condenser.

FIG. 3 illustrates the distiller 10 of FIG. 1 having a water and air-cooled chamber or plate(s) type condenser 200 instead of the double tubing condenser 94. The primary difference is that the chamber or plate(s) 202 replaces the outer tubing 96 of FIG. 1.

Figure 4:
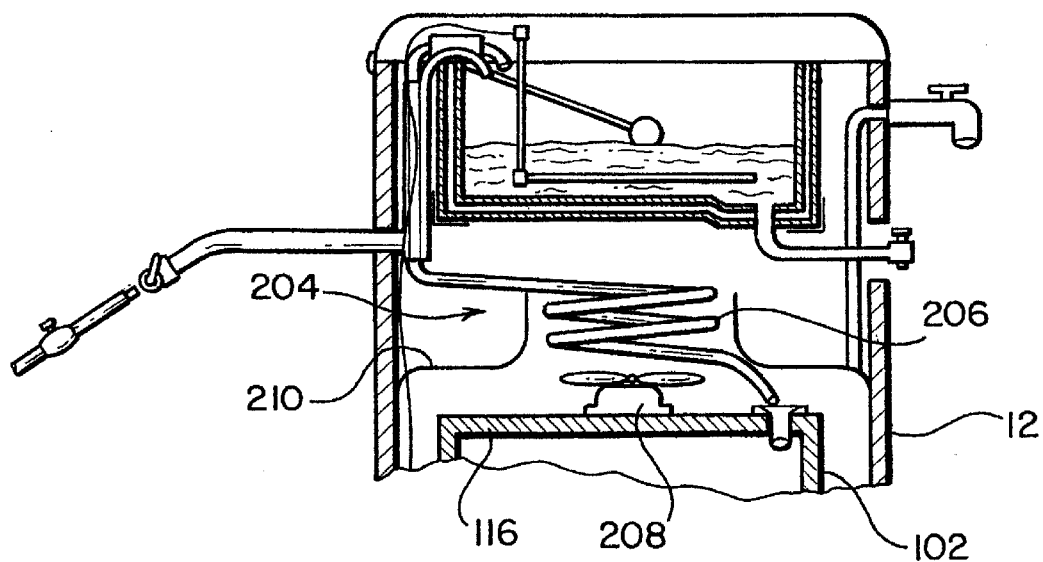
FIG. 4 is a partial cross sectional layout view of a third embodiment of the present invention, illustrating the continuous mode distiller including a typical coiled finned tubing (fins not shown) condenser and a cooling fan.

FIG. 4 illustrates the distiller 10 of FIG. 1 having a typical air-cooled, condenser 204 including coiled, finned tubing 206, a fan 208 and a shroud 210 replacing the water and air-cooled condenser 94 and the cooling water pump 130 system of FIG. 1. As seen in FIG. 4 the fan 208 may be mounted on the top wall 116 of the storage container 102 below the coiled finned tubing 206. For clarity, the fins on the tubes are not shown. The shroud 210, preferably comprising a suitable light weight plastic material, is connected to the interior of the housing 12 above the inlet air vents 190 (FIG. 2) and is open at its top to direct air flow through finned tubing 206.

Figure 5:
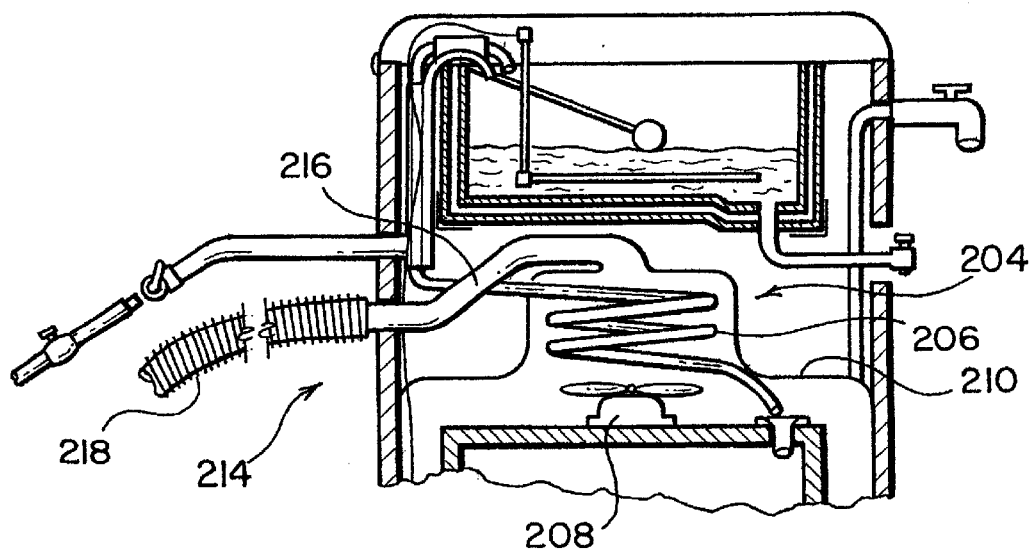
FIG. 5 is a partial cross sectional layout view of a fourth embodiment of the present invention, illustrating the continuous mode distiller of FIG. 4 with the addition of a remote exhaust system.

FIG. 5 illustrates the distiller 10 of FIG. 4 with the addition of a remote exhaust system 214 including an exhaust pipe 216, which may comprise a light weight plastic pipe, connected to the open upper end of the shroud 210 and protruding through the side of the housing 12. A vent hose 218, which may comprise a light weight flexible hose similar to a dryer vent hose used for a typical clothes dryer, is connected to the protruding end of the exhaust pipe 216 and provides a passageway for conveying hot air from the fine tubing 206 to a remote location such as outside of a house or building.

In operation, the present invention is a fully automatic water distiller. The water distiller 10 illustrated in FIG. 1 is a simple device which is installed simply by connecting raw water feed line 58 to inlet line 44 of the device by means of quick connect fastener 56 and by opening valve 60 on the raw water line 58. (For the water and air-cooled condenser 94 of FIG. 1, and the condenser 200 of FIG. 3, a small amount of distilled water is poured into the storage container 102 through filler 172 to provide start up water for the cooling water pump 130). The distiller 10 is then turned on to provide electric power from the circuit control box 76 to the heater 70 (and to the cooling water pump 130, of FIGS. 1 & 3) as raw water to be distilled flows into the boiler 22. When the water 32 in boiler 22 reached a desired level, automatic controller 62 turns off the water supply. The heat source 70 then boils the water 32 in boiler 22 and the resulting steam is directed through exit port 88 and through the steam tube 90, which passes through pre-heating chamber 46, to condenser 94, where the steam condenses into distilled water. This distilled water flows by gravity into storage container 102. Raw water from inlet line 44 passes through the pre-heating chamber 46, where it is pre-heated by steam tube 90 prior to entering the boiler 22 through connector line 50.

When the distilled water reaches a predetermined level in storage container 102, level control float 108 operates heater control switch 110 to break the circuit to the heater 70 (and cooling water pump 130 of FIGS. 1 & 3). When the distilled water level in container 102 is reduced to a predetermined level, the float 108 signals the control switch 110 to close the circuit to the heater 70 (and pump 130 of FIGS. 1 & 3) to thereby resume boiling water in boiler 22 to produce additional distilled water. This cycle is fully automatic, with the two float switches maintaining the desired water level in the boiler 22 and in the storage container 102. The compressor 170 cools the distilled water in the storage container 102 to a desired temperature and pump 154 delivers water on demand from container 102 to spigot 151 and or to remote spigot(s) 164.

The lid 18 on the boiler 22 is connected to the housing 12 by suitable hinge(s) 20, so that the housing 12 can be opened for ready access to the boiler 22 and other interior components such as the heater 70. The boiler 22 can be simply lifted out of the housing 12 to permit easy cleaning and maintenance. The simple and easy removal of the boiler 22 is possible because the boiler 22 is independently seated on support brackets 24 rather than being mounted to the side wall of the housing 12. Thus the boiler 22 is a totally separate and independent part. The need for cleaning the boiler 22 is minimized because the level of the raw water 32 is automatically maintained, thereby eliminating the build up of baked-on scale and chemical deposits. The boiler 22 may also have a drain 34, if desired, to periodically drain the water 32 from the boiler 22 to flush out the impurities left suspended in the water 32 during the operation of the distiller 10.

The timer control 144 may provide power to the heater 70 (and cooling water pump 130 of FIGS. 1 & 3) only during predetermined time periods; for example, between six PM and six AM, to limit the normal distillation operation to a time when an office or work place is not occupied, thus eliminating noise and radiant heat during normal working hours. This also substantially increases the energy efficiency of the distiller 10 because: (a) the heater 70 (and pump 130 of FIGS. 1 & 3) are not continuously going on and off in response to the heater control switch 110; (b) the water 32 in the boiler 22 does not have to be continuously re-heated and the incoming raw water is always preheated in the preheating chamber 46 by steam tube 90; and (c) the heater 70 (and cooling water pump 130 of FIGS. 1 & 3) only operate during off peak power demand periods, thus taking advantage of cheaper electric rates and may negate a need for an upgrade in wiring or power source. Also by allowing the level of the water 104 in storage container 102 to go down substantially during day time consumption and completely refilling it at night prevents the stored water in container 102 from becoming stale or stagnant.

The low water sensor 150 senses an extremely low water level in container 102, and allows power to the heater 70 (and pump 130 of FIGS. 1 & 3) to bypass the timer control 144, thus providing operation during times when extra production of pure water is required.

The above describes the operation of the four illustrated embodiments of the invention except for their differences in condensing systems and condenser cooling systems. The following describes these differences.

As illustrated in FIG. 1, the distiller 10 includes a water and air-cooled, downwardly coiled, double tubing condenser generally indicated at 94 and the cooling water pump 130. In operation, power is provided to pump 130 and to the heater 70 (and if desired, to a condenser cooling fan which is not shown in FIGS. 1 & 3) at the same time. Steam from the boiler 22 enters the upper end of outer tubing 96 of condenser 94 at inlet 92 and travels downwardly therein toward distillate drain terminal 100 at the lower end of outer tubing 96. At the same time, cooling water pump 130 in storage container 102 delivers cooling water upwardly through cooling water delivery line 134 to the lower end of the inner tubing 98 wherein it is conveyed in the opposite direction of the steam in the outer tubing 96 thus providing excellent heat exchange within condenser 94. The cooling water exits the inner tubing 98 at exit port 138, located near the inlet end 92 of the outer tubing 96, and flows downwardly through return line 136 to cooling water terminal 142 within container 102, providing a return passageway for the cooling water. During this condensing process the steam in outer tubing 96 gives off its heat to the ambient air and to the cooling water in inner tubing 98. The resulting distilled water within the outer tubing 96 and outside of the inner tubing 98 flows by gravity into the storage container 102. If desired, a fan may be used to enhance air movement (for example, as illustrated in FIGS. 4 & 5).

The second embodiment (FIG. 3) of the invention operates in the same way as the first embodiment (FIG. 1), the difference being that the condenser 200 is of the chamber or plate(s) type instead of the outer and inner tubing type of the first embodiment (FIG. 1).

The third embodiment (FIG. 4) of the invention operates substantially the same as the first and second embodiments (FIGS. 1 & 3), the difference being that the condenser 204 is only air-cooled. Steam from the boiler 22 is conveyed downwardly through the typical finned tubing 206. Fan 208 forces cooling-air through shroud 210 to enhance heat exchange for the finned tubing 206 during the condensing process of the steam and the resulting distilled water flows by gravity into the storage container 102.

The fourth embodiment (FIG. 5) of the invention is the same as the third embodiment (FIG. 4), with the addition of remote exhaust system 214. The fan 208 forces cooling-air through shroud 210 to enhance heat exchange for the finned tubing 206. During the heat exchange operation the cooling-air becomes warm. This warm air is conveyed through exhaust pipe 216 and vent hose 218 to a remote location such as outside of a house or building.

Thus, it will be seen that the water distiller of the present invention is unique and provides numerous improvements and advantages over the prior art. The distiller is well suited for use in a wide variety of locations, including dentist offices, hospitals, homes, schools, restaurants, cafeterias, business offices, and the like, as may be desired.

Although the invention has been described in terms of preferred embodiments, it will be understood that these are exemplary and that the scope of the invention is limited only by the following claims.

What is claimed is:

1. A distiller, comprising:
   a housing having side and bottom walls and an open top;
   a seat located within said housing below said open top;
   a heating vessel for receiving liquid to be distilled, said vessel being removably mounted on said seat, located within said housing, and being removable from said housing through said open top;
   a lid for closing said housing open top and for closing and sealing said heating vessel;
   a heater mounted on said lid and positioned within said heating vessel when said lid is closed, said heater being operable to boil liquid in said vessel to provide steam;
   a condenser having an inlet and an outlet and located within said housing below said heating vessel;
   a collection container within said housing below said condenser;
   a passageway extending from said heating vessel to said condenser for conveying steam downwardly from said vessel to said condenser inlet, said condenser converting said steam to distillate; and
   means for conveying said distillate downwardly from said condenser outlet to said collection container.

2. The distiller of claim 1, including a heat exchanger in said passageway between said heating vessel and said condenser.

3. The distiller of claim 2, further including a feed line for delivering liquid to said heating vessel, said feed line passing through said heat exchanger.

4. The distiller of claim 1, wherein said heater is an immersible electric heater mounted on a support secured to said lid for motion into and out of said heating vessel as said lid is closed and opened.

5. Distillation apparatus, comprising:
   a heating vessel having side and bottom walls and an open top for receiving water to be distilled;
   a heater located within said heating vessel above bottom wall, said heater being operable to boil water in said heating vessel to produce steam;
   a lid for closing said open top of said heating vessel;
   a support secured to said lid for supporting said heater within said heating vessel when said lid is closed;
   a condenser mounted below said heater, said condenser having an inlet and an outlet;
   a passageway extending from said heating vessel to said condenser inlet for conveying steam from said heating vessel to said condenser, said condenser converting said steam to distillate;
   a collection container mounted below said condenser, and
   an outlet line connected to said condenser outlet and leading into said container for conveying said distillate to said collection container.

6. The distiller of claim 5, wherein said lid is operable to remove said heater from said heating vessel and to permit access to and removal of said heating vessel.

7. The distiller of claim 6, wherein said lid includes an inlet for conveying water to said heating vessel.

8. The distiller of claim 7, further including a heat exchanger in said passageway for heating water supplied to said inlet by said steam.

9. The distiller of claim 8, wherein further including a level controller for regulating the amount of water in said heating vessel.

10. The distiller of claim 9, further including a water level sensor in said container and control means responsive to said water level sensor for regulating said heater.

11. A water distiller including:
    a heating vessel for receiving water to be distilled;
    a housing having bottom and side walls and an open top for removably receiving said heating vessel;
    a seat in said housing for positioning said heating vessel within said housing below said open top;
    a lid for closing said open top of said housing and for sealingly closing said open top of said heating vessel, said lid being openable for access to said heating vessel and for removal of said heating vessel from said housing;
    a heater support secured to said lid;
    a heater mounted on said heater support and positioned within said heating vessel for heating water in said heating vessel when said lid is closed;
    a water level controller for regulating the amount of water in said heating vessel;
    a condenser connected to said heating vessel through said lid; and
    a container connected to said condenser for receiving distillate.

12. The water distiller of claim 11, wherein said heating vessel, said condenser, and said container are in a vertically stacked relationship, wherein said condenser is located above said container, and said heating vessel is located above said condenser.

13. The water distiller of claim 12, further including a water supply connected to supply water to said heating vessel to provide a continuous distilling operation.

* * * * *